United States Patent [19]

Yates et al.

[11] Patent Number: 4,719,242

[45] Date of Patent: Jan. 12, 1988

[54] DEIONIZATION SORBENT COMPRISED OF ION EXCHANGE RESIN AND POLYMER BINDER AND FERROMAGNETIC SUBSTANCE

[75] Inventors: Stephen F. Yates, Arlington Heights; Santi Kulprathipanja, Hoffman Estates, both of Ill.

[73] Assignee: Allied-Signal Inc., Morristown, N.J.

[21] Appl. No.: 811,622

[22] Filed: Dec. 20, 1985

[51] Int. Cl.[4] ............................................. C08D 5/20
[52] U.S. Cl. ........................................................ 521/28
[58] Field of Search ............................ 521/28; 525/455

[56] References Cited

U.S. PATENT DOCUMENTS 3,725,291  4/1973  Serbus et al. ........................ 521/28
4,523,996  6/1985  Charles et al. ....................... 521/28

FOREIGN PATENT DOCUMENTS 0046896  10/1982  European Pat. Off. .

OTHER PUBLICATIONS

Chem. Abstracts, vol. 97, entry 22760, H. Heller et al.
Chem. Abstracts, vol. 100, entry 23364u, Reese et al.

Primary Examiner—Joseph L. Schofer
Assistant Examiner—Peter F. Kulkosky
Attorney, Agent, or Firm—Thomas K. McBride; John F. Spears, Jr.; E. Jerome Maas

[57] ABSTRACT

A method for the preparation of an ion exchange sorbent containing at least one anion exchange resin, a ferromagnetic substance, and a water permeable organic polymer binder, as well as a process for the use of said sorbent to separate removable anions from feed streams containing said anions.

17 Claims, No Drawings

DEIONIZATION SORBENT COMPRISED OF ION EXCHANGE RESIN AND POLYMER BINDER AND FERROMAGNETIC SUBSTANCE

BACKGROUND OF THE INVENTION

The removal of select ions from process streams and waste streams is a problem whose solution is always sought after, especially so since recent regulations have mandated the removal of ions like chromate ion from waste streams in order to decrease this ion content to a maximum acceptable level of said ions in said effluent waste stream. One of the ways to capture these removable ions is to use ion exchange methodology with ion exchange resins in a fixed or fluidized bed. The advantage that a fluidized bed offers is that of greater rates of flowthrough and resistance to clogging by particulate impurities, but a disadvantage exists in that the fines, or small particles of the bed, are carried out of the fluidized bed thereby contaminating the effluent and losing expensive sorbent. These disadvantages can be overcome through permanent magnetization of the sorbent particles but resident magnetism in these particles causes flocculation to occur anywhere in the apparatus and its associated plumbing.

BRIEF SUMMARY OF THE INVENTION

As hereinbefore mentioned, there is a need for an ion exchange sorbent which can be used in a fluidized bed ion exchange process wherein said sorbent would not only perform the ion exchange by adsorbing removable anions but also would provide a means for curtailing the loss of sorbent out the top of said fluidized beds during the processing of aqueous streams containing said removable anions and prevent flocculation with its associated clogging problems.

It is therefore an object of this invention to provide both a method for the preparation of such a sorbent as well as a method of preparation of the sorbent composition itself.

It is a further object of this invention to provide a process for the exchange of ions using this sorbent with a liquid medium containing unwanted ions in a magnetically stabilized fluidized bed.

In one aspect, an embodiment of this invention resides in a method for the manufacture of a sorbent comprising at least one weakly basic anion exchange resin, a ferromagnetic substance, and a water permeable organic polymer binder, which method comprises:

(a) mixing together said resin, said ferromagnetic substance, said binder, and an organic solvent capable of dissolving said binder thereby forming a malleable mixture;

(b) removing said solvent from said mixture to obtain a dry solid;

(c) forming said solid to the desired size and shape and recovering the resultant sorbent.

Another aspect of this invention is found in a process for the exchange of anions which comprises subjecting a liquid medium containing removable anions to contact with a sorbent, said sorbent being a composite of at least one anion exchange resin, a ferromagnetic substance, and a water permeable organic polymer binder, in an ion exchange zone under the influence of a magnetic field of strength sufficient to stabilize said sorbent as a fluidized bed comprising the steps of (a) loading said sorbent by passing an acidic aqueous feed stream containing removable anions through said fluidized bed at a flow rate that affords maximum sorption of said anions by said sorbent resulting in a purified feed stream;

(b) stripping said sorbent of said removable anions by passing a basic aqueous stream through said fluidized bed and discarding or reusing said effluent stream;

(c) regenerating said sorbent by passing an acidic aqueous stream through said fluidized bed.

Other objects and embodiments will be found in the following further detailed description of the present invention.

DETAILED DESCRIPTION OF THE INVENTION

As hereinbefore set forth, the present invention is concerned with the removal of anions from liquid streams containing said ions using an anion exchange sorbent containing a ferromagnetic substance to stabilize the sorbent particles in a magnetically stabilized fluidized bed process.

In order to prepare said sorbent, a weak anion exchange resin can be transformed from the ordinary bead appearance to a dry powder having a particle size of from about 10 microns to about 150 microns, using any method known to a person skilled in the art. The weakly basic anion exchange resin comprises polymeric amines, such as crosslinked polyvinylbenzyldimethylamine, but other weakly basic anion exchange resins should function in this invention though not necessarily with equivalent results. It is also contemplated within the scope of this invention that mixtures of weakly basic anion exchange resins can also be used.

A second ingredient in this invention is a ferromagnetic substance, preferably in powdered form, whose purpose is to cause the sorbent to have its movement restricted while under the influence of a magnetic field. Two general classifications of these ferromagnetic substances are known to the art and include the class called hard magnetic substances and the class called soft magnetic substances. A hard magnetic substance is a material which retains its magnetism after the inducing magnetic field is shut off, while a soft magnetic substance is a material which rapidly loses most of its magnetism after the inducing magnetic field is turned off, and has a high magnetic permeability and a low coercivity. In this application and in the appended claims the use of the term ferromagnetic substance is to be read to mean a soft ferromagnetic substance.

The third ingredient in said sorbent is a water permeable organic polymer binder whose purpose is to hold together said resin and said ferromagnetic substance in discrete particles capable of sorbing said removable anions from a liquid stream containing said ions, and for this purpose is best chosen with smaller alkyl pendant or substituent groups so as to be a more polar binder. For purposes of this application and in the appended claims, the term sorbent will refer to particles capable of adsorbing the removable anions and thereby removing said ions from the liquid stream containing said ions, and the term water permeable will include both water permeability and substrate permeability.

Soft magnetic substances are characterized by high permeability and low coercivity and occur within six major crystalline groupings including iron and low carbon steels, iron-silicon alloys, iron-aluminum and iron-aluminum-silicon alloys, nickel-iron alloys, iron-cobalt alloys, and ferrites, as well as amorphous soft magnetic alloys near the $(Fe_1Co_1Ni_1)_{80}(P_1B_1Al_1Si_1C)_{20}$ composition where the eighty and twenty refer to percent composition respectively. Any or all of these alloy types will provide a soft magnetic substance for inclusion in said sorbent of this present invention. Iron alloys can be taken from the group including, but not limited to, 3% silicon, 4% silicon, 30% silicon, 45% silicon (Permalloy), 50% nickel (Hipernik), 78.5% nickel (78 Permalloy), 4% molybdenum and 79% nickel (supermalloy), 5% copper, 2% chromium and 77% nickel (mumetal), 3% molybdenum, 14% copper, and 72% nickel (1040 alloy), 50% cobalt (Permendur), 1.8% vanadium and 49% cobalt (Vanadium Permendur), and 5% aluminum and 10% silicon (Sendust) wherein all percents are by weight and enough iron is added to make 100% by weight of each alloy.

The anion exchange resin can be either gel-type or macroreticular and includes, but is not limited to, resins manufactured by the Rohm & Haas Corporation known in the trade as "Amberlite" and as "Duolite" as well as those manufactured by the Dow Corporation and known in the trade as "Dowex". Other anion exchange resins manufactured by other corporations can also be used but not necessarily with equivalent results.

Representative examples of the anion exchange resins of the weakly basic gel-type polystyrene or phenolic polyamine include Amberlite IRA-45, IR-4B, IRA-68, IRA-60, and IRA-58, Duolite A-6, A-4F, ES-375, and A-340, and Dowex WGR and WGR-Z.

Representative examples of the anion exchange resins of the macroreticular type include Amberlite IRA-35, IRA-93, IRA-94, IRA-99, and Amberlyst A-21, Duolite ES-308, ES-368, ES-366, A-7, A-374, A-378, and A-561, and Dowex MWA-1.

Mixtures of the gel-type anion exchange resins with the macroreticular anion exchange resins are capable of functioning in this invention as are mixtures of the gel-type or mixtures of the macroreticular type resins. For instance, Amberlite IRA-68 might be mixed with Amberlite IRA-45, Amberlite IRA-68 might be mixed with Duolite ES-375, Amberlite IR-4B might be mixed with Amberlite IRA-60, and Duolite ES-375 might be mixed with Dowex WGR.

Said binder can include, but is not limited to, cellulose ethers such as ethyl cellulose, methyl cellulose, propyl cellulose, butyl cellulose, hydroxyethyl cellulose, hydroxypropyl cellulose, cyanoethyl cellulose, and diethylaminoethyl cellulose, as well as cellulose esters such as cellulose acetate, cellulose nitrate, cellulose sulfate, cellulose butyrate, cellulose propionate, cellulose isobutyrate, cellulose benzoate, and celluose acetatebutyrate. Additionally, polystyrene divinylbenzene can also be used as a binder.

Solvents can include, but are not limited to, acetone, p-dioxane, methyl ethyl ketone, ethyl acetate, chloroform, benzyl alcohol, cyclohexanone, formamide, acetic acid, diethylketone, toluene, and acetonitrile. For purposes of this application and the appended claims, the word solvent will be taken to mean both a single solvent as well as a mixture of solvents.

One method for preparation of the sorbent of this invention utilizes a mixing of the resin with the ferromagnetic substance, and then with a water permeable organic polymer binder prior to introduction of the solvent, in such a way as to minimize the stratification of these ingredients. Once a homogeneous mixture is achieved, a solvent is introduced to dissolve the binder thus resulting in formation of a malleable mixture which is then dried to a solid and formed to the desirable shape and size. Possible methods of drying include extrusion into water to remove the solvent followed by further drying to remove the water, drying under vacuum with or without heating, and conventional oven drying, all performed at temperatures ranging from about 10° C. to about 110° C. The resultant solid can be formed by methods including, but not limited to, extrusion, chopping, grinding, and extrusion combined with chopping or grinding.

A second possible method for the preparation of this sorbent utilizes the same ingredients as the first method but differs in that the ferromagnetic substance and the resin are first mixed together in powdered form and then this powder mixture is added to a separate mixture of the binder with said solvent to form the malleable mixture which is then treated as in the before-mentioned method.

A third method of preparation of the sorbent entails a mixing of binder prepolymer monomers in a solvent with subsequent controlled polymerization to form a solution of the binder. This binder solution is then mixed with the powdered anion exchange resin and with the powdered ferromagnetic substance to form a homogeneous mixture which is subsequently dried to a solid and formed to the desirable shape and size.

After forming to the desired size and shape, the sorbent will contain the ion exchange resin in a range from about 30 wt % to about 85 wt %, the ferromagnetic substance in a range from about 5 wt % to about 30 wt %, and the water permeable organic polymer binder in a range from about 10 wt % to about 50 wt %. In one embodiment, said sorbent particles range from about 100 microns to about 300 microns.

Ion exchange can be accomplished utilizing methods such as fixed beds, fluidized beds, and magnetically stabilized fluidized beds (MSFB). While fixed bed problems such as high pressure and low flow rate can be alleviated through use of a fluidized bed, this use of a fluidized bed introduces new problems concerning the movement of the particles of the fluidized bed. Prior art attempted to correct these problems by use of magnetic stabilization of these mobile particles but said art used hard magnetic substances whereas this invention incorporates soft ferromagnetic substances to curtail the effluent contamination by sorbent fines as well as to control the migration of sorbent or fluid throughout the bed (axial dispersion).

Through use of the magnetically stabilized fluidized bed (MSFB) the sorbent of this invention is utilized in a method for the exchange of ions which comprises subjecting a liquid medium containing removable anions to contact with a sorbent, said sorbent being a composite of at least one anion exchange resin, a ferromagnetic substance, and a water permeable organic polymer binder, in an ion exchange zone under the influence of a magnetic field of strength sufficient to stabilize said sorbent as a fluidized bed comprising the steps of (a) loading said sorbent by passing an acidic aqueous feed stream containing removable anions through said fluidized bed at a flow rate that affords maximum sorption of said anions by said sorbent resulting in a purified feed stream;

(b) stripping said sorbent of said removable anions by passing a basic aqueous stream through said fluidized bed and discarding or reusing said effluent stream; and, (c) regenerating said sorbent by passing an acidic aqueous stream through said fluidized bed.

In the above mentioned process, regeneration of this sorbent occurs at a pH of from 1 to about 3, loading of the sorbent occurs at a pH of from 1 to about 4, and stripping of the sorbent occurs at a pH of from about 8 to about 14, and the flow rate ranges from about 0.018 to about 1.0 centimeter per second.

The sorbent of this invention is held in place in the MSFB through use of an external magnetic field ranging from about 25 gauss to about 500 gauss. Such stabilization results in a diminishing of the axial dispersion normally present in a fluidized operation as well as in a formation of the sorbent particles into linear networks instead of the cross-linked network arrangement found in the prior art. Said prior art utilized hard magnetic substances that were magnetized externally and then utilized in a fluidized bed separation. Said particles required occasional external remagnetizations, and probably caused clogging problems due to flocculation in the associated plumbing of the MSFB. In this invention, the sorbents do not require external remagnetization as they are magnetic at any time the external magnetic field is applied and the sorbents do not cause flocculation problems in that the sorbent particles lose most of their magnetism upon cessation of the external magnetic field.

Removable ions sorbed by the sorbent of this invention include, but are not limited to, the hexavalent oxidation state, (an oxidation number of plus six), of chromium, selenium, sulfur, and manganese. These ions are found in waste streams such as metal finishing streams as well as in cooling water blowdown and other similar operations. It is contemplated as within the scope of this invention to run this ion exchange process in a batch manner as well as in a recirculating manner, and to sorb ions such as tetrachloroplatinate ion and tetrachloropalladate ion.

The following examples are given for purposes of illustration. However, it is to be understood that these examples are only illustrative in nature and that this invention is not necessarily limited thereto.

EXAMPLE I

In an open pan, 200 grams (g) of Amberlite IRA-68 (Rohm and Haas weak anion exchange resin) was heated to 104° C. for 3 days. The resin was then ground in a ball mill and screened and the fraction which passed through the 140 mesh screen was used in the following procedure.

In an open beaker, 20 g powdered Amberlite IRA-68, 5 g powdered 1:1 nickel-iron alloy, and 7 g powdered Eastman Kodak cellulose acetate were mixed until the mixture appeared homogeneous. To this mixture was added in small portions a total of 43 ml acetone with continuous stirring. The mixture darkened in color and became lumpy, then acquired the consistency of bread dough. After kneading this material until it appeared homogeneous, the paste was transferred to an evaporating dish, chopped into small pieces, and placed in a 50° C. oven overnight. The hard and brittle product was then ground in a mechanical grinder to obtain 28.65 g of 20–50 mesh material and 6.6 g of 50–140 mesh material.

EXAMPLE II

In an open beaker, 30 g of finely ground Amberlite IRA-68 ion exchange powder, 10 g. of ethyl cellulose, and 20 g. of 1:1 nickel-iron alloy were dry mixed until the mixture appeared homogeneous. To this mixture was gradually added a total of 70 milliliters (ml) of acetone with continuous stirring, resulting in a mixture with a dough-like consistency. This dough was broken into small pieces, air-dried at room temperature for 2 hours, heated to 105° C. for 12 hours, and now brittle solid was ground to granular particles of a 50–140 mesh size.

EXAMPLE III

In an open beaker, 30 g of finely ground Amberlite IRA-68 ion exchange powder, 10 g of cellulose acetate and 20 g of 1:1 nickel-iron alloy were mixed dry until the mixture appeared homogeneous. To this mixture was gradually added 35 ml of acetone with continuous stirring resulting in a mixture with a dough-like consistency. This dough was extruded through a ⅛ inch circular die into a pan of water, the resulting strands were soaked in water for 24 hours, allowed to dry, and ground to granular particles of a 50–140 mesh size.

EXAMPLE IV 14.5 grams (g) of styrene and 35.5 g of divinylbenzene and 0.6 g of benzoyl peroxide were combined with 140 milliliters (ml) of toluene and heated in a water bath at about 80° C. to form a colloidal suspension of prepolymer. To this suspension was added, with stirring, 120 g of finely ground Amberlite IRA-68 ion exchange powder and 80 g of 1:1 nickel-iron alloy. The resulting mixture was extruded and subsequently heated for 12 hours at about 80° C. to form a solid sorbent which was then formed to the requisite mesh size of 50–140 mesh.

EXAMPLE V

A 2.5 centimeter (cm) glass column was mounted vertically in the center of a cylindrical DC solenoid magnet and charged with 66 ml of the dry sorbent. A 90 Gauss (G) magnetic field was applied, and a feedwater stream was admitted at the base of the column with a velocity of 0.34 cm/sec, which is a velocity sufficient to fluidize the sorbent particles. The pH of the feedstream was acidified until the effluent stream had a pH of 3.16 at which time the feedstream was changed to pH 3.0 water containing 4.1 parts per million (ppm) zinc, 2.4 ppm cadmium, 3.6 ppm chromium (III), and 11.4 ppm chromium (VI).

Samples of the effluent stream were taken periodically for analysis wherein the concentrations were determined by atomic absorption spectrophotometry. The chromium (VI) concentration was measured by adding tartaric acid and 1,5-diphenylhydrazide to the sample, agitating it, and then measuring the absorption of the sample at 540 nanometers (nm). The results of these analyses indicated that breakthrough of the zinc and cadmium occurred immediately, but breakthrough of the chromium (VI) never occurred. After 212 minutes the feed was changed to water and then at 242 minutes the feed was changed to 0.1 M sodium bicarbonate in order to strip the chromium (VI) from the column as a concentrated stream.

We claim as our invention:

1. A method for the manufacture of a sorbent comprising at least one weakly basic ion exchange resin, a ferro-magnetic substance, and a water permeable organic polymer binder, which method comprises
   (a) mixing together said resin, said ferromagnetic substance, said binder, and an organic solvent capable of dissolving said binder thereby forming a malleable mixture, said binder being selected from the group consisting of cellulose esters and cellulose ethers;

(b) removing said solvent from said mixture to obtain a dry solid;

(c) forming said solid to the desired size and shape; and (d) recovering the resultant sorbent.

2. The method of claim 1 further characterized in that said resin, ferromagnetic substance, and binder, in powdered forms, are first mixed together to obtain a powder mixture, and said organic solvent is thereafter added to said powder mixture to obtain said malleable mixture.

3. The method of claim 1 further characterized in that said binder is first dissolved in said organic solvent and thereafter mixed with said resin and said ferromagnetic substance to obtain said malleable mixture.

4. The method of claim 1 further characterized in that said polymer binder is formed in said organic solvent from monomers through controlled polymerization, and thereafter mixed with said resin and said ferromagnetic substance to obtain said malleable mixture.

5. The method of claim 1 further characterized in that said solvent is removed from said malleable mixture by drying said mixture at a temperature in the range of from about 25° C. to about 105° C.

6. The method of claim 1 further characterized in that said cellulose ester is cellulose acetate.

7. The method of claim 1 further characterized in that said cellulose ester is cellulose nitrate.

8. The method of claim 1 further characterized in that said cellulose ester is cellulose acetate-butyrate.

9. The method of claim 1 further characterized in that said cellulose ether is ethyl cellulose.

10. The method of claim 1 further characterized in that said cellulose ether is hydroxyethyl cellulose.

11. The method of claim 1 further characterized in that said cellulose ether is methyl cellulose.

12. The method of claim 1 further characterized in that said organic solvent is taken from the group comprising acetone, p-dioxane, methyl ethyl ketone, ethyl acetone, chloroform, benzyl alcohol, cyclohexanone, formamide, acetic acid, diethyl ketone, toluene, and acetonitrile.

13. The method of claim 1 further characterized in that said ferromagnetic substance comprises a 1:1 nickel-iron alloy.

14. A sorbent prepared by the method of claim 1.

15. The sorbent of claim 12 further characterized in that said organic polymer binder is present in said sorbent in a range from about 10 wt. % to about 50 wt. %.

16. The sorbent of claim 12 further characterized in that said ferromagnetic substance is present in said sorbent in a range of from about 5 wt. % to about 30 wt. %.

17. The sorbent of claim 12 further characterized in that said resin is present in said sorbent in a range of from about 30 wt. % to about 85 wt. %.

* * * * *